US007162045B1

(12) United States Patent
Fujii

(10) Patent No.: US 7,162,045 B1
(45) Date of Patent: Jan. 9, 2007

(54) SOUND PROCESSING METHOD AND APPARATUS

(75) Inventor: Shigeki Fujii, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 831 days.

(21) Appl. No.: 09/595,655

(22) Filed: Jun. 16, 2000

(30) Foreign Application Priority Data

Jun. 22, 1999 (JP) ................................ 11-175925
Nov. 12, 1999 (JP) ................................ 11-323191

(51) Int. Cl.
*H04B 15/00* (2006.01)

(52) U.S. Cl. ..................................... 381/94.2; 704/228

(58) Field of Classification Search ................ 381/119, 381/1, 17–18, 104, 61, 63, 94.2–94.3, 57, 381/110, 94.7, 93, 66; 704/232, 214, 202, 704/259, 503, 228, 233
See application file for complete search history.

(56) References Cited

U.S. PATENT DOCUMENTS 4,454,609 A * 6/1984 Kates .......................... 381/68
5,212,733 A * 5/1993 DeVitt et al. ............... 381/119
5,440,639 A * 8/1995 Suzuki et al. ................. 381/17
5,541,999 A * 7/1996 Hirai ............................. 381/2
5,569,038 A * 10/1996 Tubman et al. ............. 434/308
5,569,869 A * 10/1996 Sone ........................... 84/609
5,960,391 A * 9/1999 Tateishi et al. ............. 704/232
6,138,093 A * 10/2000 Ekudden et al. ............ 704/228
6,195,438 B1 * 2/2001 Yumoto et al. ............. 381/103
6,339,758 B1 * 1/2002 Kanazawa et al. .......... 704/226
6,360,199 B1 * 3/2002 Yokoyama .................. 704/214
6,587,565 B1 * 7/2003 Choi ........................... 381/98
6,985,594 B1 * 1/2006 Vaudrey et al. ............... 381/96

FOREIGN PATENT DOCUMENTS

| | | | |
|---|---|---|---|
| GB | 0451557 | | 8/1936 |
| GB | 2252023 | | 7/1992 |
| GB | 2269969 | | 2/1994 |
| GB | 2343347 | | 5/2000 |
| JP | 7044759 | | 5/1995 |
| JP | 2591472 | | 12/1998 |
| WO | 9416538 | | 7/1994 |
| WO | WO 94/16538 | * | 7/1994 |
| WO | 9908380 | | 2/1999 |
| WO | WO 99/08380 | * | 2/1999 |

* cited by examiner

*Primary Examiner*—Vivian Chin
*Assistant Examiner*—Lao Lun-See
(74) *Attorney, Agent, or Firm*—Pillsbury Winthrop Shaw Pittman LLP

(57) ABSTRACT

A sound processing method and apparatus are provided, which are capable of performing sound processing on input audio signals containing a plurality of signal components being different in desired sound processing conditions, in a manner that allows natural sound to be reproduced. An input audio signal of at least one system is separated into a plurality of separated signal components, and each signal component of at least part of the plurality of separated signal components is subjected to individual sound processing according to the signal component, and the plurality of separated signal components are outputted as at least one audio signal after each signal component of the at least part thereof is subjected to the individual sound processing. The plurality of separated signal components are synthesized into a synthesized audio signal, which is then outputted, or alternatively, the plurality of separated signal components are outputted separately as audio signals.

19 Claims, 7 Drawing Sheets

SOUND PROCESSING METHOD AND APPARATUS

BACKGROUND OF THE INVENTION

1. Field of the Invention

The present invention relates to a sound processing method and apparatus for performing predetermined sound processing such as sound field control, sound quality control and interval control on an input audio signal to obtain a desired audio signal, and more particularly to a sound processing method and apparatus especially suitable for sound processing of audio signals containing sounds from a plurality of sound generating sources.

2. Prior Art

In a conventional sound processing apparatus, an input audio signal of one system is assumed to be a sound source signal of one system, and desired sound processing is performed on this input signal according to predetermined processing steps. This will be explained in detail by referring to a conventional sound field addition apparatus as shown in FIG. 7. In the apparatus shown in FIG. 7, a sound field control operation is performed on audio signals XL, XR that are input as a 2-channel stereophonic signal by sound field controllers 101*a*, 101*b* with a sound field control function f(X). The sound field-controlled signals fXL, fXR are output-controlled by an output controller 102 to be output as output audio signals YL, YR.

Another known example of sound field control processing system is disclosed by Japanese Patent Publication (Kokoku) No. 7-44759, in which sound field control is performed on a sum signal and a difference signal which are generated from a 2-channel stereophonic signal as an input signal.

However, no sound processing apparatus has ever been known in which an input audio signal is first separated into a plurality of separated signal components, which are then subjected to preliminary processing, and independent sound processing is performed on each of these signal components. Thus, it has been very difficult to selectively enhance or suppress individual sound source signals contained in the input audio signal to create a natural spatial impression of sound with a presence.

For example, in a sound field addition apparatus for adding a hall sound field to an input audio signal, it is basically assumed that a single sound source exists only on a stage. Addition of initial reflecting sounds or reverberation sounds is carried out based on this assumption. Thus, as long as the input audio signal can be regarded as a signal from a single sound source, the conventional sound field addition apparatus can perform optimum sound field addition processing without any particular preliminary processing such as separation, enhancement and suppression of the input audio signal. However, when many sound sources also exist outside of the stage, the sound field control based on the above assumption cannot provide satisfactory results.

More specifically, even if sounds recorded at a plurality of sound fields (places) are contained in the input audio signal, the conventional sound processing apparatus performs identical sound processing on these sounds from the different sound sources contained in the input audio signal so that the resulting output sound is not necessarily natural.

When, for example, on-the-spot broadcast speech sound and ambient sound from the audience are mixed in the input signal as in a live sports broadcasting, addition of a hall sound field should be performed only on the ambient sound. However, the conventional sound processing apparatus adds reflecting and reverberation sounds not only to the ambient sound but also to the broadcast speech sound so that the reproduced speech sound becomes extremely unnatural like so-called public address system speech. Further, when an interval change is performed by the conventional apparatus, the interval of the ambient sound is changed together with that of the on-the-spot broadcast speech sound, resulting in a very uncomfortable reproduced sound.

SUMMARY OF THE INVENTION

It is an object of the present invention to provide a sound processing method and apparatus which are capable of performing sound processing on input audio signals containing a plurality of signal components being different in desired sound processing conditions, in a manner that allows natural sound to be reproduced.

To attain the above object, the present invention provides a sound processing method comprising the steps of separating an input audio signal of at least one system into a plurality of separated signal components, subjecting each signal component of at least part of the plurality of separated signal components to individual sound processing according to the signal component, and outputting the plurality of separated signal components as at least one audio signal after each signal component of the at least part thereof is subjected to the individual sound processing.

In a preferred embodiment of the present invention, the outputting step comprises synthesizing the plurality of separated signal components with the at least part thereof subjected to the individual sound processing into a synthesized audio signal, and outputting the synthesized audio signal, or alternatively, it comprises outputting the plurality of separated signal components with the at least part thereof subjected to the individual sound processing, separately as audio signals.

In a typical preferred embodiment of the present invention, the input audio signal contains an ambient sound component and an on-the-spot speech sound component in a live broadcasting, and the at least part of the plurality of separated signal components comprises the ambient sound component and the on-the-spot speech sound component.

In a preferred embodiment of the present invention, the sound processing comprises sound field control processing.

To attain the above object, the present invention further provides a sound processing apparatus comprising a signal separator that separates an input audio signal of at least one system into a plurality of separated signal components, a sound processor that subjects each signal component of at least part of the plurality of separated signal components to individual sound processing according to the signal component, and an output controller that outputs the plurality of separated signal components as at least one audio signal after each signal component of the at least part thereof is subjected to the individual sound processing.

In a typical embodiment of the present invention, the output controller synthesizes the plurality of separated signal components with the at least part thereof subjected to the individual sound processing into a synthesized audio signal, and outputs the synthesized audio signal, or alternatively, the output controller outputs the plurality of separated signal components with the at least part thereof subjected to the individual sound processing, separately as audio signals.

In a preferred embodiment of the present invention, the signal separator performs spectrum analysis upon the input audio signal to extract a specific signal component, and subtracts the extracted specific signal component from the input audio signal to obtain a remaining signal component of the input audio signal.

In another preferred embodiment of the present invention, the signal separator comprises a plurality of signal enhancement/suppression devices that enhance part of a plurality of signal components contained in the input audio signal, and suppress remaining signal components.

In a further preferred embodiment of the present invention, the input audio signal comprises audio signals of a plurality of channels, and the signal separator comprises a plurality of signal separators corresponding respectively to the plurality of channels, and wherein each of the plurality of signal separators performs predetermined sound processing by supplementarily referring to at least one of the audio signals of at least one other channels than a channel corresponding thereto, thereby improving accuracy of separation of the input audio signal of the corresponding channel into a plurality of signal components.

In a preferred embodiment of the present invention, the sound processor comprises a sound field controller that performs sound field control processing upon each signal component of the at least part of the plurality of separated signal components.

The sound processor may be modified to perform the following operations, for example:

1) selectively eliminate at least part of the plurality of separated signal components, and use an externally input audio signal, instead;

2) change sound quality or voice quality of each signal component of at least part of the plurality of separated signal components;

3) change pitch of each signal component of at least part of the plurality of separated signal components; and 4) change speed relative to time axis or speech speed of each signal component of at least part of the plurality of separated signal components.

According to the above construction of the present invention, the input audio signal is first separated into a plurality of separated signal components, at least part of which are each be sound-processed individually and independently so that desired reproduced sound can be obtained.

In sound processing of an input audio signal in which on-the-spot speech sound and ambient sound are mixed as in a live sports broadcasting, according to the invention, the input signal is first separated into a plurality of separated signal components, and each signal component of at least part of the separated signal components is subjected to sound processing which is suitable for the signal component, before it is output-controlled. Optimum sound processing of each of the signal components is thus made possible, and desired reproduced sound can be created that is natural and harmonizes with listener's feeling. When the present invention is applied to a live sports broadcasting, for example, ambient sound and on-the-spot speech sound are separated from each other and subjected to separate sound processing so that natural live broadcast sound can be provided to listeners.

The above and other objects, features and advantages of the present invention will be more apparent from the following detailed description taken in conjunction with the accompanying drawings.

DETAILED DESCRIPTION OF PREFERRED EMBODIMENTS

The present invention will now be described with reference to the drawings showing embodiments thereof.

Figure 1:
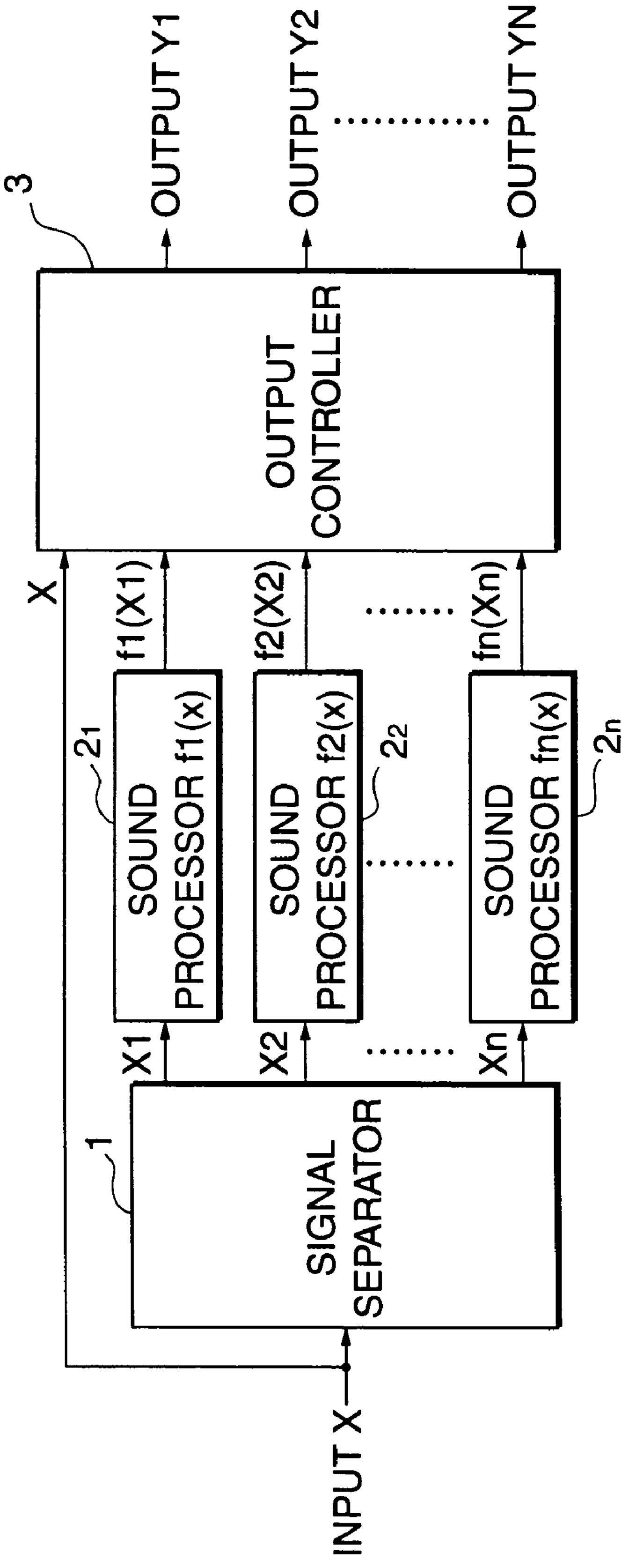
FIG. 1 is a block diagram showing the basic construction of a sound processing apparatus according to an embodiment of the present invention.

FIG. 1 shows the basic construction of a sound processing apparatus according to an embodiment of the present invention.

An input audio signal X is input to a signal separator 1 where the input signal is separated according to a predetermined method (algorithm) into a plurality of separated signal components corresponding to the types of sound sources. The plurality of separated signal components X1, X2, . . . , Xn are fed to respective sound processors $\mathbf{2}_1$, $\mathbf{2}_2$, . . . , $\mathbf{2}_n$. In the illustrated embodiment, as many signal processors $\mathbf{2}_1$ to $\mathbf{2}_n$ as the number of the separated signal components X1 to Xn obtained by the signal separator 1 are provided. However, depending upon the kind of processing operation to be performed, the input audio signal X may be fed to an output controller 3 without being processed. The sound processors $\mathbf{2}_1$ to $\mathbf{2}_n$ perform sound processing upon respective separated signal components in a manner suitable for the signal components using respective sound processing functions f1(*x*), f2(X), . . . , fn(X), and output sound processed signal components f1(X1), f2(X2), . . . , fn(Xn) to the output controller 3. The output controller 3 performs mixing processing or the like on the sound processed signal components as input signals according to the specifications of a final output system such as the number and location of speakers, and output the resulting output audio signals Y1, Y2, . . . , YN.

Figure 2:
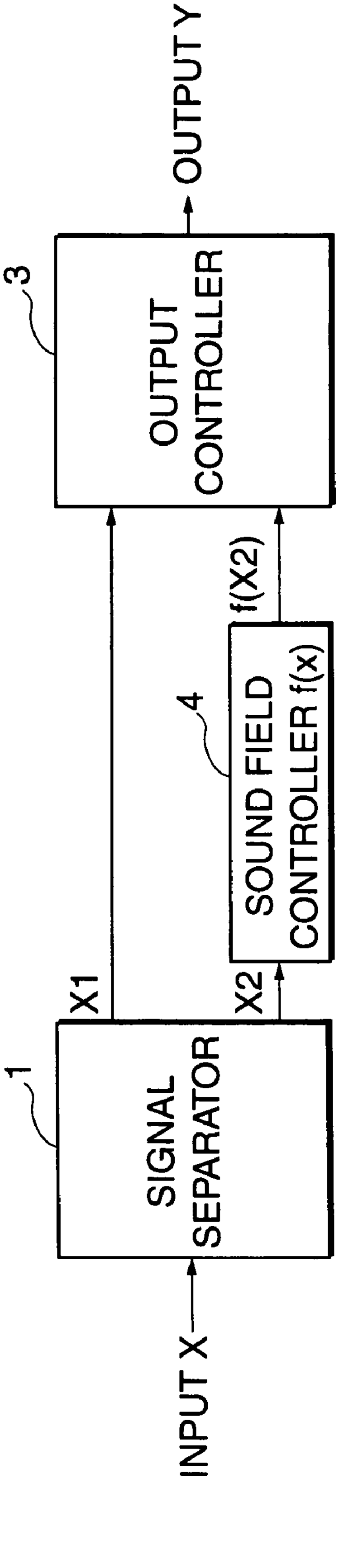
FIG. 2 is a block diagram showing the construction of a sound processing apparatus according to the present invention applied to sound processing of a live sports broadcast sound as a specific example of the sound processing apparatus of FIG. 1.

FIG. 2 shows the construction of a sound processing apparatus of the present invention applied to sound processing of a live sports broadcast sound as a specific example of the sound processing apparatus of FIG. 1.

An input audio signal generated from live sports broadcasting contains on-the-spot speech sound of an announcer and/or a commentator and ambient sound. The input audio signal X is separated into two signal components, that is, on-the-spot speech sound X1 and ambient sound X2, by the signal separator 1. The ambient sound signal component X2 is subjected to sound field control to provide the reproduced sound with a presence by a sound field controller 4, and the resulting sound field-controlled signal component f(X2) is input to the output controller 3. The on-the-spot speech sound signal component X1 is not subjected to any processing operation in order not to impair the feeling of localization. The output controller 3 properly processes the signal components X1, f(X2) and outputs an output audio signal Y.

Figure 3:
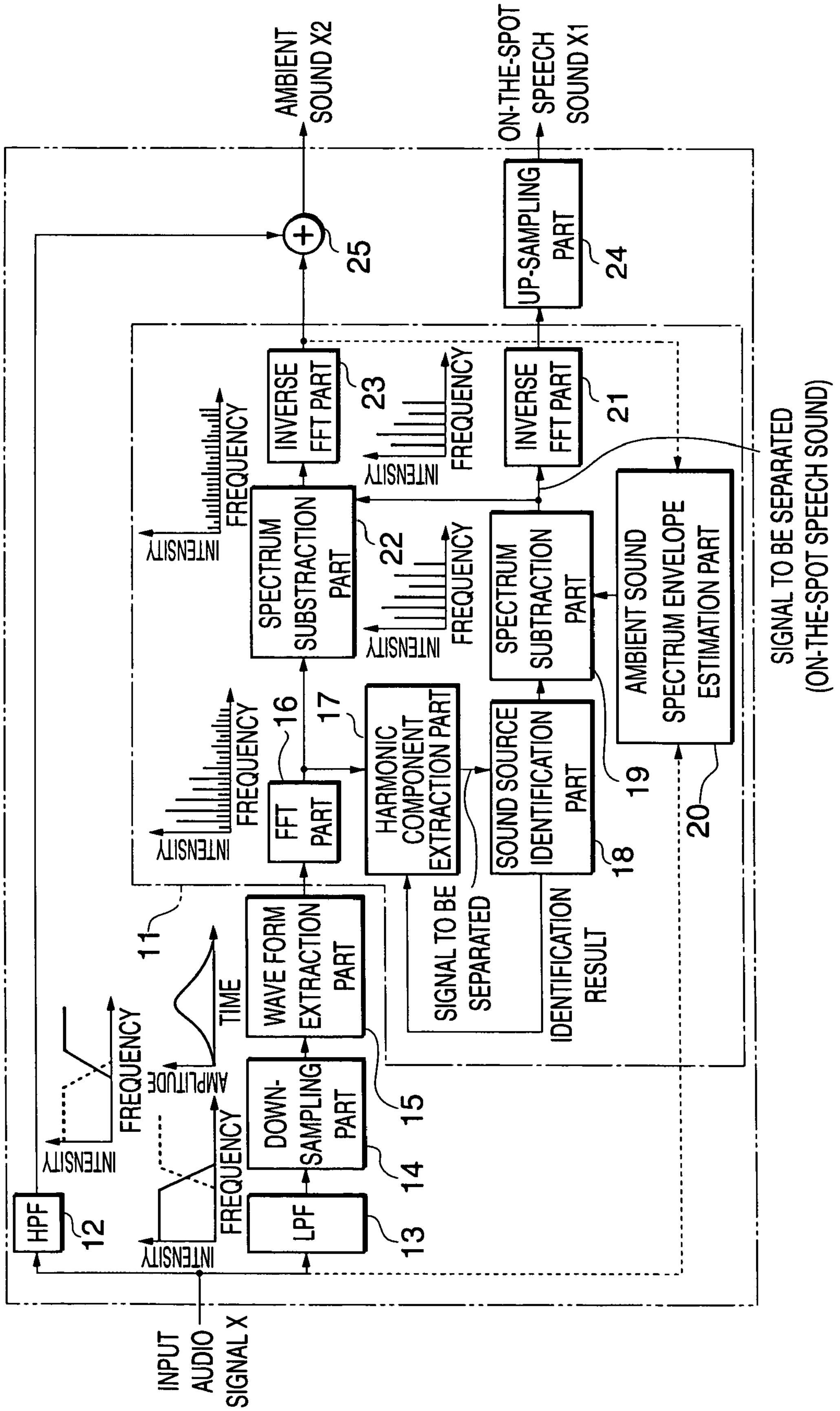
FIG. 3 is a block diagram useful in explaining the construction of a signal separator of the sound processing apparatus of FIG. 2.

FIG. 3 shows an example of the construction of the signal separator 1. An optimum method for signal separation should be adopted according to the input audio signal to be separated, and the method for signal separation is not limited to a specific one according to the present invention. In the present embodiment, the input audio signal X is assumed to contain a mixture of on-the-spot speech sound and ambient sound as in a live sports broadcasting. In the signal separator 1 in FIG. 3, the on-the-spot speech sound component X1 is first extracted by a spectrum analyzer 11. Then, the extracted speech sound component X1 is subtracted from the original signal X to obtain the ambient sound component X2.

A flow of the signal separating operation will be described below with reference to FIG. 3.

From the audio signal that is input to the signal separator 1, only a high frequency band component contained in the ambient sound is extracted by a high-pass filter (HPF) 12, and only a low frequency band component that contains the on-the-spot speech sound component is extracted by a low-pass filter (LPF) 13. The low frequency band signal component that is output from the low-pass filter 13 is subjected to a down-sampling operation by a down-sampling part 14. The down-sampling ratio of the down-sampling operation is different depending upon the band splitting frequency, and the ratio is determined to be in such a range that information contained in the frequency component is not lost. For example, an equal half-split method may be employed to perform down-sampling to one half frequency, wherein the information contained in the signal component is not lost by the down-sampling to one half frequency. Such a down-sampling operation serves to reduce the amount of processing operation such as frequency spectrum analysis by the spectrum analyzer 11, and speed up the processing operation.

The signal component that has undergone the down-sampling operation is then subjected to waveform extraction with a suitable time window by a waveform extraction part 15. Then, the signal component of the extracted waveform is fed to the spectrum analyzer 11, wherein the signal component is first transformed into a frequency domain signal component by a FFT part 16. The spectrum analyzer 11 of the present embodiment adopts Fast Fourier Transformation (FFT) as the transformation method. The present invention is, however, not limited to this particular method. The signal component that has been time-frequency transformed in the present embodiment is defined as being represented by the frequency information of each frequency component and the intensity information of each frequency component.

Next, the transformed frequency domain signal component from the FFT part 16 is subjected to extraction and identification of the on-the-spot speech sound component by a harmonic component extraction part 17 and a sound source identification part 18. A sound signal of on-the-spot speech sound or the like basically has a harmonic structure that the fundamental wave component is accompanied by higher harmonic components with frequencies which are integral multiples of the fundamental frequency, and therefore it is determined by the extraction and identification operations whether a signal component having such a harmonic structure, that is, an on-the-spot speech sound component, exists in the frequency domain signal component or not. For the determination, Spectrum Summation Method or the like may be used. If, as a result of the extraction and identification operations, it is determined that an on-the-spot speech sound component exists in the frequency domain signal component, the frequency and intensity information of harmonic components including the fundamental wave of the on-the-spot speech sound component are identified.

However, the signal component identified by the extraction and identification operations contains, at this stage, not only the on-the-spot speech sound component and higher harmonic components thereof, but also an ambient sound component of the same frequencies superposed on the former. Thus, it is necessary to eliminate this ambient sound component. It is theoretically impossible to completely separate these components having the same frequency. In the present embodiment, based on the assumption that the spectrum envelope (frequency characteristics) of the ambient sound is nearly constant in time, the power variation of the frequency characteristics is estimated from instantaneous power of the input audio signal and instantaneous power of the high frequency band signal component by an ambient sound spectrum envelope estimation part 20. In the ambient sound spectrum envelope estimation part 20, a mean spectrum envelope of the ambient sound component is obtained by a statistical calculation based upon stored spectrum envelope information and a spectrum envelope of the ambient sound obtained when the speech sound signal is determined to be absent.

An on-the-spot speech sound signal component (signal to be separated) is obtained by subtracting the frequency component estimated by the ambient sound spectrum envelope estimation part 20 from the frequency component that is output by the harmonic component extraction part 17 and sound source identification part 18, using Spectrum Subtraction Method or the like by a spectrum subtraction part 19. The obtained signal component (signal to be separated) is fed to an inverse FFT part 21, wherein the signal component in the frequency domain is transformed into a signal component in the time domain. The transformed signal component is fed to an up-sampling part 24 to be subjected to an up-sampling operation which finally returns the signal component to a signal component having the original sampling frequency. The returned signal component is output as the on-the-spot speech sound signal component X1 to the sound field controller 4.

On the other hand, a spectrum subtraction part 22 subtracts in the frequency domain the on-the-spot speech sound component (signal to be separated) from the signal component output from the FFT part 16. The resulting signal component is subjected to an inverse FFT operation by an inverse FFT part 23 to be returned into the time domain. A high frequency band signal component having passed through the high-pass filter 12 is added to the signal component returned into the time domain by an adder 25 to obtain the ambient sound signal component X2. The ambient sound signal component X2 thus obtained is output to the sound field controller 4 through a different output terminal from one through which the on-the-spot speech sound signal component X1 is output. In the above described manner, the input audio signal is separated into a plurality of separated signal components by the signal separator 1 constructed as described above.

In the present embodiment, considering that in general an on-the-spot speech sound should be clear and easily audible, no addition of a sound field effect such as reflecting sound and reverberation sound components is made to the on-the-spot speech sound component or the amount of addition is minimized. On the other hand, reflecting sound and reverberating sound components are added in suitable amounts to the ambient sound component, using the well known technique of virtual sound image localization processing or the like in order to provide the reproduced sound with a presence such that the reflecting sound and reverberation sound surround the whole sound field. It is to be understood that such a sound field control performed by the sound field controller 4 depends strongly upon the nature of the input audio signal or the user's requirements, and therefore there is no limitation on the controlling method itself.

Figure 4:
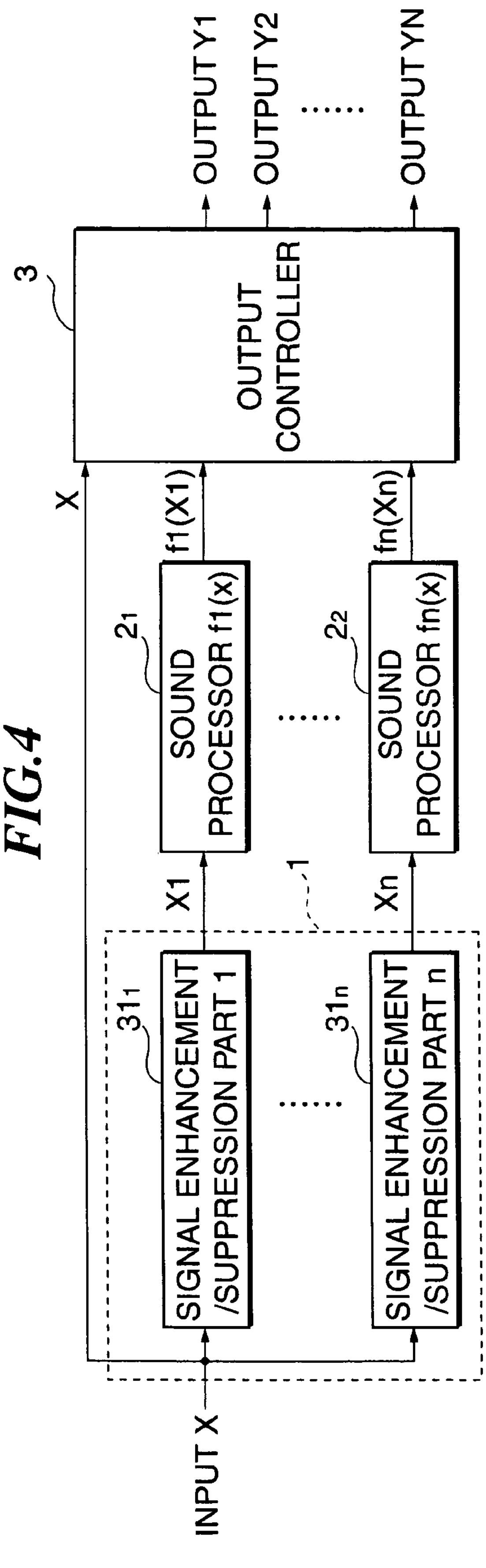
FIG. 4 is a block diagram showing the basic construction of a sound processing apparatus according to another embodiment of the present invention which employs signal enhancement and suppression processing circuits as the signal separator.

In the embodiment described above, the signal separator 1 is constructed such that the input audio signal is spectrum-analyzed to extract specific signal components. Alternatively, the signal separator may be constructed such that a signal enhancement and suppression operation is performed on each of the signal components, as shown in FIG. 4. In the apparatus shown in FIG. 4, the signal separator 1 is composed of a plurality of signal enhancement/suppression parts $\mathbf{31}_1$ to $\mathbf{31}_n$. The audio signal X that is input to the signal separator 1 is separated into a plurality of separated signal components according to a predetermined method (algorithm). Among the plurality of separated signal components, signal components X1, . . . , Xn are enhanced or suppressed by the signal enhancement/suppression parts $\mathbf{31}_1$ to $\mathbf{31}_n$ and are fed to sound processors $\mathbf{2}_1$ to $\mathbf{2}_n$, respectively. Here, basically, as many sound processors $\mathbf{2}_1$ to $\mathbf{2}^n$ are provided as the number of the output signal components from the signal enhancement/suppression parts $\mathbf{31}_1$ to $\mathbf{31}_n$. Depending upon the kind of processing to be performed, the input audio signal may be fed directly to the output controller 3 without passing through the signal enhancement/suppression parts 311 to 31*n*, i.e., without being processed. In the sound processors 21 to 2*n*, a predetermined sound processing operation is performed on each enhanced/suppressed signal component, and the sound-processed signal components f1(X1), . . . , fn(Xn) are output to the output controller 3. The output controller 3 performs on the sound-processed signal components as input signals, an output control operation such as a mixing operation according to the sound reproducing system, and outputs the processed signals as the output audio signals Y1, Y2, . . . ,YN.

Figure 5:
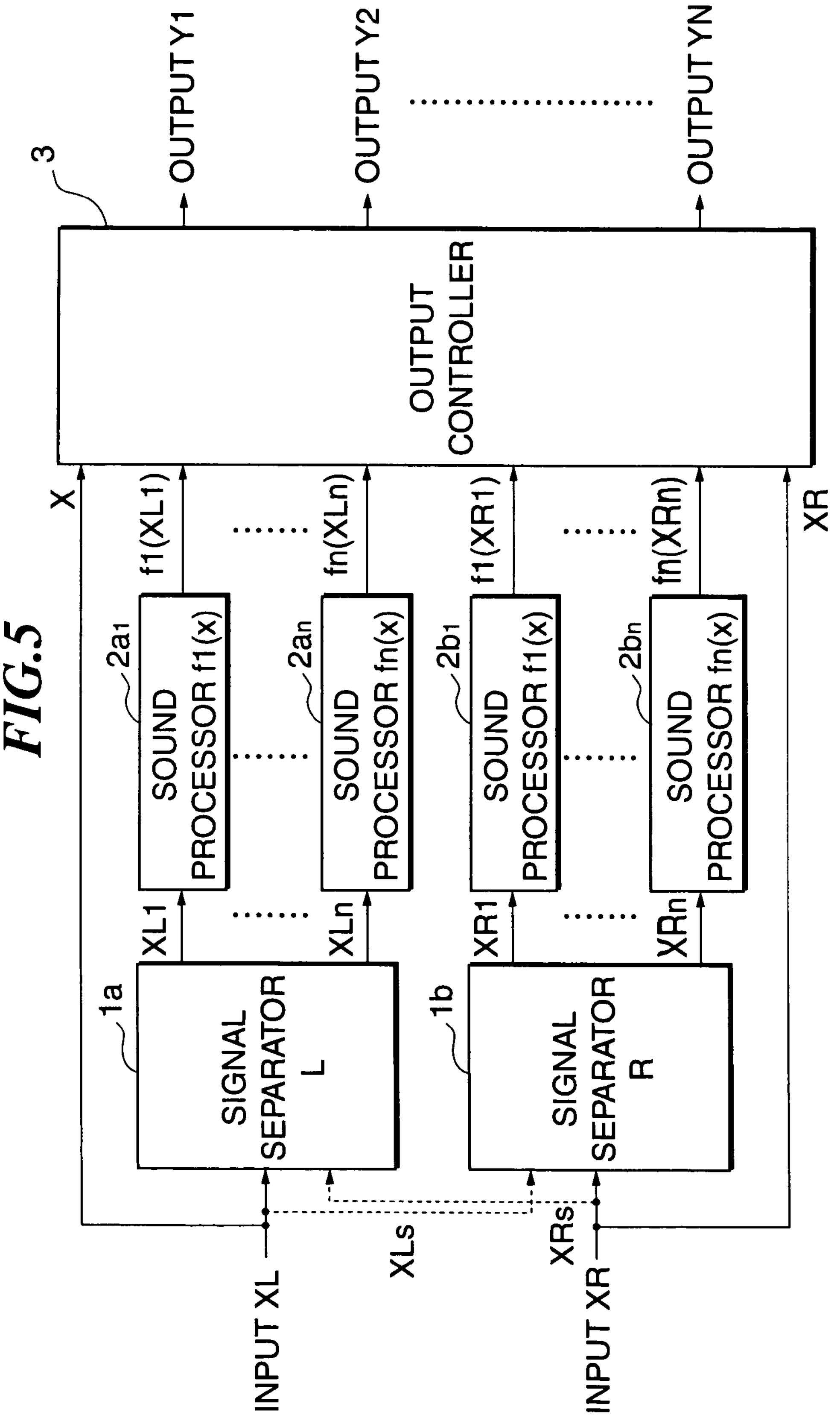
FIG. 5 is a block diagram showing the basic construction of a sound processing apparatus according to still another embodiment of the present invention applied to sound processing of a two channel signal.

The above described embodiments deal with a single input signal. In the case of an input audio signal of two systems XL, XR as shown in FIG. 5, a left signal separator (L) 1*a* and a right signal separator (R) 1*b* are provided for a left input audio signal XL and a right input audio signal XR, respectively. Each of the signal separators 1*a*, 1*b* separates a corresponding input audio signal into a plurality of separated signal components XL1, . . . , XLn, XR1, . . . , XRn. Then, sound processors $\mathbf{2}a_1$ to $\mathbf{2}a_n$, $\mathbf{2}b_1$ to $\mathbf{2}b_n$ each perform a sound processing operation individually upon a corresponding one of the separated signal components. The resulting processed signals are subjected to an output control operation according to the output system by the output controller 3, and then are output. In the case of such a plurality of input audio signals, a main component such as a component corresponding to a central location is often contained as a common component in each input signal. When, for example, this common component is the target component to be separated, a simple and relatively precise separation (cancelling and elimination for separation) is possible by carrying out necessary addition and subtraction of signal components after these input signals have been adjusted in level so as to bring the target component in each of these input signals to almost the same level. More specifically, for the purpose of improving the accuracy of the signal separation, as shown by broken lines in FIG. 5, the left input audio signal XL and the right input audio signal XR that are the input signals of the left and right channels, respectively, are input to the right signal separator (R) 1*b* and the left signal separator (L) 1*a*, respectively, as supplementary input signals XLs, XRs. The right signal separator (R) 1*b* and the left signal separator (L) 1*a* each perform an enhancement operation on the target signal component to be separated by referring to the supplementary input signal XLs or XRs to thereby improve the accuracy of separation of the input audio signal. It is to be understood that main targets for signal separation operation of the left signal separator (L) 1*a* and the right signal separator (R) 1*b* remain to be the proper input audio signals to the respective channels, and therefore the use of the supplementary input signals is within the spirit and scope of the present invention.

Figure 6:
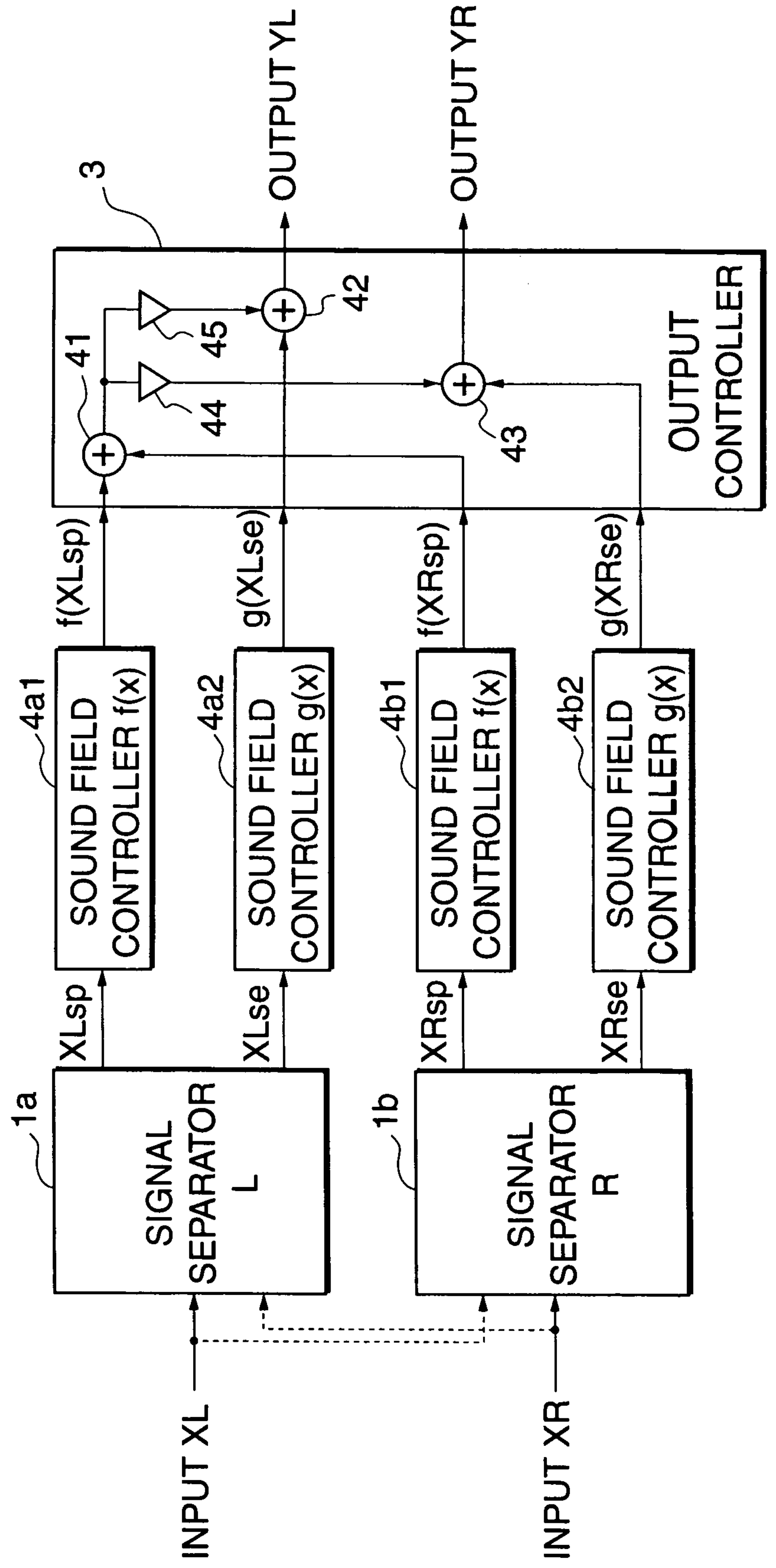
FIG. 6 is a block diagram showing the construction of a sound processing apparatus of the present invention applied to sound processing of a live sports broadcasting as a specific example of the sound processing apparatus of FIG. 5.
Figure 7:
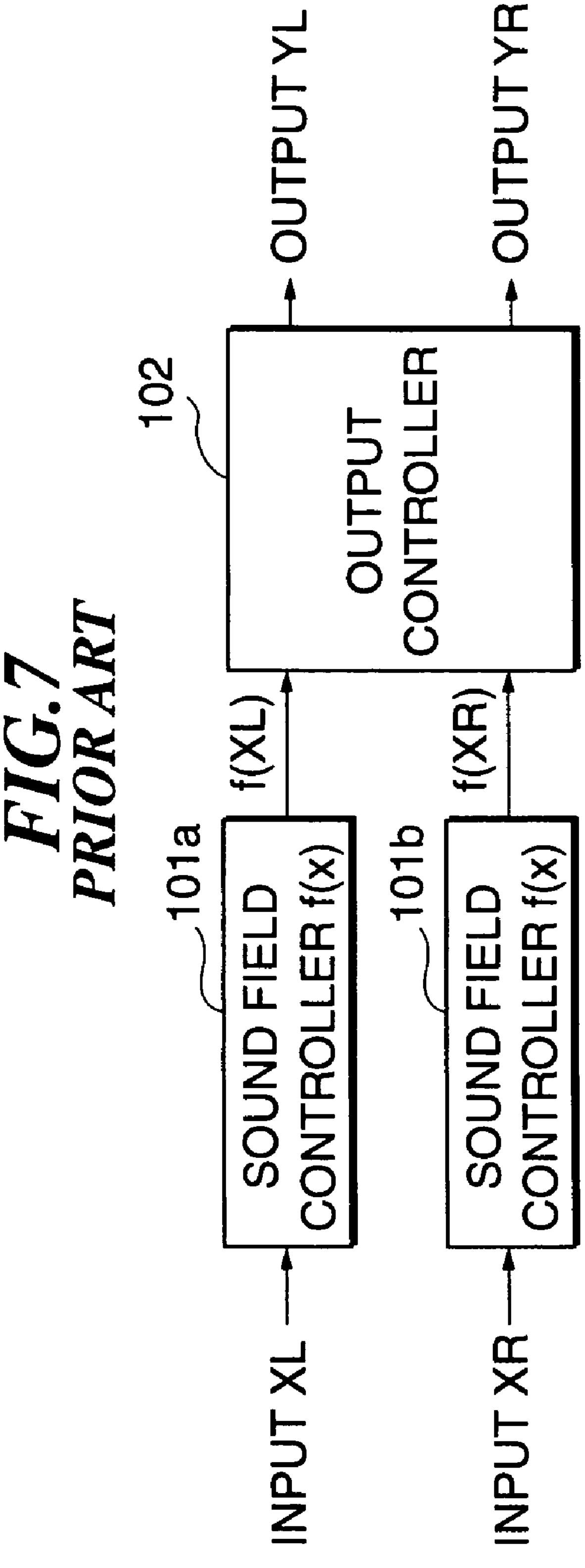
FIG. 7 PRIOR ART
FIG. 7 is a block diagram showing the construction of a prior art sound processing apparatus.

FIG. 6 shows the construction of a sound processing apparatus according to the present invention, which is applied to sound processing of a live sports broadcasting as a specific example of the sound processing apparatus of FIG. 5. As basic input audio signals, two-channel stereophonic input signals, i.e., a left channel input audio signal XL and a right channel input audio signal XR are input to the sound processing apparatus of FIG. 6. As a desired example, the signal components of the left and right input audio signals XL, XR are assumed to be a speech sound in a typical live sports broadcasting program with a left on-the-spot speech sound component XLsp and a right on-the-spot speech sound component XRsp positioned in the center, and a left ambient sound component XLse and a right ambient sound component XRse arranged somewhat spread in the background.

The signal separator 1 has a construction based on the number of input signals. In the illustrated example, two systems, that is, the left signal separator (L) 1*a* and the right signal separator (R) 1*b*, are provided. In the signal separator 1, an internal processing operation is performed on each of the left and right input audio signals XL, XR, so that each input audio signal is separated into an on-the-spot speech sound component and an ambient sound component. In the case of the left input audio signal XL, for example, the input signal is separated into the left on-the-spot speech sound component XLsp and the left ambient sound component XLse by the left signal separator (L) 1*a*. The internal signal separation operation is performed on each of the audio signals XL, XR that is input as a monaural signal. When the two-channel stereophonic input signals contain a sound component from the same sound source in the center as in the present embodiment, the left input audio signal XL and the right input audio signal XR which are the input signals of the left and right channels, respectively, can be input to the right signal separator (R) 1*b* and the left signal separator (L) 1*a*, respectively, as the above-mentioned supplementary input signals XLs, XRs, as shown by broken lines in FIG. 6, and an enhancing operation or a like operation can be performed on the target signal component to be separated, by referring to the supplementary input signals to improve the accuracy of the separation of the input audio signals. Then, a predetermined sound field control operation is performed on each on-the-spot speech sound component and each ambient sound component by each of sound field controllers $4a_1$, $4a_2$, $4b_1$, $4b_2$ which are provided in a number corresponding to the number of the separated signal components.

The sound field controllers $4a_1$, $4a_2$, $4b_1$, $4b_2$ are divided into ones $4a_1$, $4b_1$ having a sound field control function f(x) for the on-the-spot speech sound component, and ones $4a_2$, $4b_2$ having a sound field control function g(x) for the ambient sound component. A predetermined sound field control operation is performed on each component by each corresponding sound field controller $4a_1$, $4a_2$, $4b_1$, or $4b_2$. The left and right on-the-spot speech sound components f(XLsp, f(XRsp) and ambient sound components g(XLse), g(XRse) obtained by the sound field control of the sound field controllers $4a_1$, $4a_2$, $4b_1$, $4b_2$ are fed to the output controller 3. In the output controller 3, the left and right on-the-spot speech sound components fed from the sound field controller $4a_1$, $4b_1$ are first synthesized by an adder 41. Next, the right ambient sound component g(XRse) and the on-the-spot speech sound component synthesized by the adder 41 and a multiplier 44 are synthesized by an adder 43, and the left ambient sound component g(XLse) and the on-the-spot speech sound component synthesized by the adder 41 and a multiplier 45 are synthesized by an adder 42. In this way, output signals in a form that matches the sound reproducing system, i.e., left and right output audio signals YL, YR, are output, to be reproduced in two-channel stereophonic reproduction.

Although the FIG. 6 example employs a sound reproducing system for reproducing two-channel stereophonic outputs YL, YR, the sound reproducing system itself is not limited in any way by the present invention. It is generally said that the presence of a sound field is enhanced by increasing the number of output channels. Needless to say, if the number of output channels is to be increased, the sound field controller will have to be also increased or changed in number so as to increase the number of outputs to accommodate the increased number of output channels. It is assumed here that the outputs generate a reproduced sound such that the on-the-spot speech sound is located at the center with the ambient sound located to the left and right sides.

The sound processing per each signal component according to the present invention is not limited to the above described sound field control operation. For example, when the invention is applied to a live sports broadcasting with an announcer and two commentators a, b, the sound processing may be performed such that the on-the-spot speech sound of the announcer is changed to a desired interval or sound quality, that of the commentator a is silenced, and that of the commentator b is changed to a different speech speed.

For the aged and the handicapped with poor auditory function, sound processing is useful not simply for increasing the sound volume but also for improving the audibility of sound especially by emphasizing high frequency band components. On the other hand, for ambient sound, the sound volume adjustment, change of sound quality (equalizing) and the like are useful. Such a control operation depends upon the nature of input audio signals as well as on the taste of users, and the method of control is not limited to those described above. The signal that is processed by the sound processor 2 is finally fed to the output controller 3.

Further, the sound processing according to the present invention includes a processing operation of selectively eliminating the separated signal components and using an externally input signal, instead.

What is claimed is:

1. A sound processing method comprising the steps of:

separating an input audio signal of at least one system into a plurality of separated signal components corresponding respectively to a plurality of different types of sound sources, the input audio signal containing an ambient sound component and an on-the-spot speech sound component, at least part of the plurality of the separated signal components including the ambient sound component and the on-the-spot speech component, the separating of the input audio signal including:

extracting a frequency component of an on-the-spot speech sound from the input audio signal, identifying the frequency component of the on-the-spot speech sound from the input audio signal, estimating a frequency component of an ambient sound from the input audio signal, obtaining the on-the-spot speech sound component by subtracting the frequency component estimated for the ambient sound from the frequency component identified for the on-the-spot speech sound, and obtaining the ambient sound component by subtracting the on-the-spot speech sound component from the audio input signal;

subjecting each of the ambient sound component and the on-the-spot speech component of at the least part of the plurality of separated signal components to individual sound processing, the sound processing of the ambient sound component including sound field control processing for creating a spatial impression of sound with a presence; and outputting the plurality of separated signal components as at least one audio signal after each signal component of the at least part thereof is subjected to the individual sound processing.

2. A sound processing method as claimed in claim 1, wherein said outputting step comprises synthesizing the plurality of separated signal components with the at least part thereof subjected to the individual sound processing into a synthesized audio signal, and outputting the synthesized audio signal.

3. A sound processing method as claimed in claim 1, wherein said outputting step comprises outputting the plurality of separated signal components with the at least part thereof subjected to the individual sound processing, separately as audio signals.

4. The sound processing method of claim 1, wherein the ambient sound spectrum envelope estimation part estimates a power variation of frequency characteristics based on an instantaneous power of the input audio signal and instantaneous power of a high frequency band signal component, and obtains a mean spectrum envelope of the ambient sound component based on stored spectrum envelope information and a spectrum envelope of the ambient sound signal obtained when a speech signal is determined to be absent, thereby estimating the frequency component.

5. A sound processing apparatus comprising:

a signal separator that separates an input audio signal of at least one system into a plurality of separated signal components corresponding respectively to a plurality of different types of sound sources, the input audio signal containing an ambient sound component and an on-the-spot speech sound component, at least part of the plurality of separated signal components including the ambient sound component and the on-the-speech sound component, the signal separator including:

a harmonic component extraction part that extracts a frequency of on-the-spot speech sound from a frequency domain signal component of the input audio signal supplied thereto, a sound source identification part that identifies a frequency component of the on-the-spot speech sound from the frequency domain signal component of the input audio signal supplied thereto, an ambient sound spectrum envelope estimation part that estimates a frequency component of ambient sound of the input audio signal, a spectrum subtraction part that obtains an on-the-spot speech sound component by subtracting the frequency component estimated by the ambient sound spectrum envelope estimation part from the frequency component output from the sound source identification part, and a spectrum subtraction part that obtains an ambient sound component by subtracting the on-the-spot speech component from the input audio signal supplied thereto;

a sound processor that subjects each of the ambient sound component and the on-the-spot speech sound component of the at least part of the plurality of separated signal components to individual sound processing suitable for the signal component, the sound processing on the ambient sound component including sound field control processing for creating a spatial impression of a sound with a presence; and an output controller that outputs the plurality of separated signal components as at least one audio signal after each signal component of the at least part thereof is subjected to the individual sound processing.

6. A sound processing apparatus as claimed in claim 5, wherein said output controller synthesizes the plurality of separated signal components with the at least part thereof subjected to the individual sound processing into a synthesized audio signal, and outputs the synthesized audio signal.

7. A sound processing apparatus as claimed in claim 5, wherein said output controller outputs the plurality of separated signal components with the at least part thereof subjected to the individual sound processing, separately as audio signals.

8. A sound processing apparatus as claimed in claim 5, wherein said signal separator comprises a plurality of signal enhancement/suppression devices that enhance part of a plurality of signal components contained in said input audio signal, and suppress remaining signal components.

9. A sound processing apparatus as claimed in claim 5, wherein said input audio signal comprises audio signals of a plurality of channels, and said signal separator comprises a plurality of signal separators corresponding respectively to said plurality of channels, and wherein each of said plurality of signal separators performs predetermined sound processing by supplementarily referring to at least one of the audio signals of at least one channel other than a channel corresponding thereto, thereby improving accuracy of separation of the input audio signal of the corresponding channel into a plurality of separated signal components.

10. A sound processing apparatus as claimed in claim 5, wherein said sound processor comprises a sound field controller that performs sound field control processing upon each signal component of the at least part of the plurality of separated signal components.

11. A sound processing apparatus as claimed in claim 5, wherein said sound processor selectively eliminates at least part of the plurality of separated signal components, and in place thereof uses an externally input audio signal.

12. A sound processing apparatus as claimed in claim 5, wherein said sound processor changes sound quality or voice quality of each signal component of at least part of the plurality of separated signal components.

13. A sound processing apparatus as claimed in claim 5, wherein said sound processor changes pitch of each signal component of at least part of the plurality of separated signal components.

14. A sound processing apparatus as claimed in claim 5, wherein said sound processor changes speed relative to a time axis or speech speed of each signal component of at least part of the plurality of separated signal components.

15. The sound processing apparatus of claim 5, wherein the ambient sound spectrum envelope estimation part estimates a power variation of frequency characteristics based on an instantaneous power of the input audio signal and instantaneous power of a high frequency band signal component, and obtains a mean spectrum envelope of the ambient sound component based on stored spectrum envelope information and a spectrum envelope of the ambient sound signal obtained when a speech signal is determined to be absent, thereby estimating the frequency component.

16. A sound processing method comprising the steps of:

separating an input audio signal of at least one system into a plurality of separated signal components corresponding respectively to a plurality of different types of sound sources, the input audio signal containing an ambient sound component and an on-the-spot speech sound component, at least part of the plurality of the separated signal components including the ambient sound component and the on-the-spot speech component, the separating of the input audio signal including:

extracting a frequency component of an on-the-spot speech sound from the input audio signal, identifying the frequency component of the on-the-spot speech sound from the input audio signal, estimating a frequency component of an ambient sound from the input audio signal, obtaining the on-the-spot speech sound component by subtracting the frequency component estimated for the ambient sound from the frequency component identified for the on-the-spot speech sound, and obtaining the ambient sound component by subtracting the on-the-spot speech sound component from the audio input signal;

subjecting the ambient sound component to individual sound processing, the sound processing of the ambient sound component including sound field control processing for creating a spatial impression of sound with a presence; and outputting the plurality of separated signal components as at least one audio signal after each signal component of the at least part thereof is subjected to the individual sound processing.

17. A sound processing method as claimed in claim 16, wherein said outputting step includes synthesizing the plurality of separated signal components with the at least part thereof subjected to the individual sound processing into a synthesized audio signal, and outputting the synthesized audio signal.

18. A sound processing method as claimed in claim 16, wherein said outputting step includes outputting the plurality of separated signal components with the ambient sound component being subject to the individual sound processing, separately as audio signals.

19. The sound processing method of claim 16, wherein the ambient sound spectrum envelope estimation part estimates a power variation of frequency characteristics based on an instantaneous power of the input audio signal and instantaneous power of a high frequency band signal component, and obtains a mean spectrum envelope of the ambient sound component based on stored spectrum envelope information and a spectrum envelope of the ambient sound signal obtained when a speech signal is determined to be absent, thereby estimating the frequency component.

* * * * *